(12) United States Patent
Biehe et al.

(10) Patent No.: US 11,297,841 B2
(45) Date of Patent: Apr. 12, 2022

(54) ROTARY DOUGH MOLDING MACHINE

(71) Applicant: HAAS FOOD EQUIPMENT GMBH, Leobendorf (AT)

(72) Inventors: Snorre Krogh Biehe, Roskilde (DK); Hans Henrik Jochumsen, Allerød (DK); Tomas Eg Kjersgaard, Kopenhagen (DK); Stefan Jiraschek, Königsbrunn (AT)

(73) Assignee: HAAS FOOD EQUIPMENT GMBH, Leobendorf (AT)

( * ) Notice: Subject to any disclaimer, the term of this patent is extended or adjusted under 35 U.S.C. 154(b) by 262 days.

(21) Appl. No.: 16/333,026

(22) PCT Filed: Sep. 14, 2017

(86) PCT No.: PCT/AT2017/060230
§ 371 (c)(1),
(2) Date: Mar. 13, 2019

(87) PCT Pub. No.: WO2018/049455
PCT Pub. Date: Mar. 22, 2018

(65) Prior Publication Data
US 2019/0200622 A1    Jul. 4, 2019

(30) Foreign Application Priority Data

Sep. 16, 2016 (DE) .......................... 102016011122.4

(51) Int. Cl.
*A21C 11/08* (2006.01)
*B29C 43/08* (2006.01)
(Continued)

(52) U.S. Cl.
CPC .............. *A21C 11/08* (2013.01); *A21C 5/003* (2013.01); *A23P 30/10* (2016.08); *B29C 43/08* (2013.01);
(Continued)

(58) Field of Classification Search
None
See application file for complete search history.

(56) References Cited

U.S. PATENT DOCUMENTS

| 5,143,735 A | 9/1992 | Varvello et al. |
| 7,887,314 B2 * | 2/2011 | Ruhe ........................ A21C 3/02 |
| | | 425/194 |

(Continued)

FOREIGN PATENT DOCUMENTS

| CN | 104349678 A | 2/2015 |
| CN | 104381351 A | 3/2015 |
| CN | 204499269 U | 7/2015 |

(Continued)

OTHER PUBLICATIONS

EP Office Action dated Oct. 13, 2020 of Application No. 17 787 867.5-1009 (4 pages).

(Continued)

*Primary Examiner* — Jacob T Minskey
*Assistant Examiner* — Adrien J Bernard
(74) *Attorney, Agent, or Firm* — Gordon & Jacobson, P.C.

(57) ABSTRACT

A rotary dough molding machine (10). The machine has a frame (6), a die roller (4) and a feed roller (5) rotatably mounted to the frame (6) and an adjuster that adjusts the gap between die roller (4) and feed roller (5), wherein one of the rollers (4, 5), is an adjustable roller, which is movable relative to the frame (6) by the adjuster. The adjusting has a first drive (1) acting on the first end (51) of the adjustable roller (5) causing a movement of said first end (51) in a first direction (x) transverse to the rotational axis (50) of the adjustable roller (5), and a second drive (2) acting on the second end (52) of the adjustable roller (5) causing a movement of said second end (52) in a second direction (x') that is essentially parallel to the first direction (x). The first drive (1) and the second drive (2) can be actuated independently of each other.

20 Claims, 3 Drawing Sheets

(51) Int. Cl.
*B29C 43/58* (2006.01)
*A21C 5/00* (2006.01)
*A23P 30/10* (2016.01)

(52) U.S. Cl.
CPC ...... *B29C 43/58* (2013.01); *B29C 2043/5841* (2013.01)

(56) References Cited

U.S. PATENT DOCUMENTS

2006/0222749 A1 10/2006 Ruhe et al.
2015/0150267 A1* 6/2015 Haas ..................... A21C 9/08
425/337

FOREIGN PATENT DOCUMENTS

| | | |
|---|---|---|
| CN | 105208867 A | 12/2015 |
| CN | 205233311 U | 5/2016 |
| CN | 205511910 U | 8/2016 |
| EP | 0782390 B1 | 4/1999 |
| RU | 164805 U1 | 9/2016 |
| SU | 26672 A1 | 6/1932 |
| WO | WO96/04796 A1 | 2/1996 |
| WO | WO2013/182627 A1 | 12/2013 |

OTHER PUBLICATIONS

Chinese Office Action for Chinese App. No. 201780057371.5, dated Sep. 27, 2020, 7 pages.
International Search Report and Written Opinion of International Application No. PCT/AT2017/060230 dated Nov. 30, 2017.

* cited by examiner

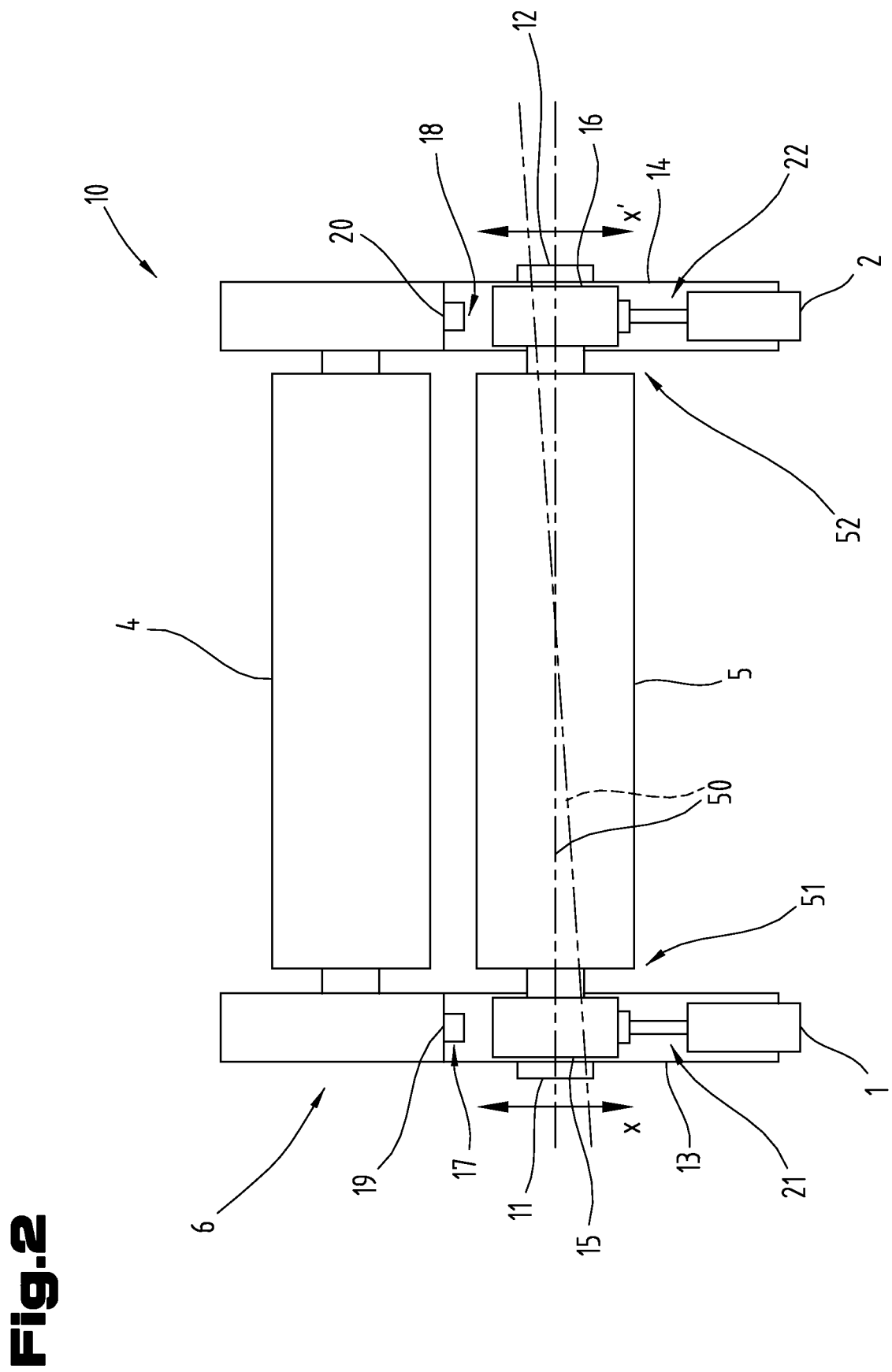

ROTARY DOUGH MOLDING MACHINE

CROSS-REFERENCE TO RELATED APPLICATION(S)

This application is the National Stage of International Patent Application No. PCT/AT2017/060230 filed on Sep. 14, 2017, which claims priority from German Patent Application No. DE 102016011122.4 filed on Sep. 16, 2016, both of which are hereby incorporated by reference herein in their entireties.

BACKGROUND

1. Field of the Invention

The invention relates to a rotary dough molding machine. In addition, the invention relates to a method for operating a rotary dough molding machine.

2. State of the Art

Rotary dough molding machines comprise a rotating die roller having on its surface a plurality of molds in the form of cavities (or recesses) for receiving dough. A feed roller (also called forcing roller) feeds dough coming from a hopper into the gap between die roller and feed roller and forces the dough into the molds of the die roller. In order to remove excess dough from the die roller a knife is provided for scraping the dough from the die roller's surface. The dough remaining in the molds is subsequently removed from the die roller usually by means of a belt, which runs in an abutting manner against the die roller.

According to prior art the adjustment of the gap in rotary molding machines has been done by an actuator arranged on one side of the machine and acting on the feed roller. The motion of the actuator has then been transferred also to the opposite side of the machine by means of mechanical linkages which were also responsible for keeping the (linear) movements of the two ends of the feed roller synchronized. The adjustment of the linkage between both sides of the machine was done during factory assembly as a permanent setting not to be altered during the operation of the machine. However, when operating rotary molders product weight differences from side to side are observed and are mostly due to suboptimal alignment of the main components of the machine, i.e. die roller, feed roller or the knife. Also the factory alignment of the feed (forcing) roller is time consuming and prone to inaccuracies. A further disadvantage can be seen in a plurality of transmission components and guide structures for transferring the motion of the actuator also to the other side of the machine, requiring a complicated design and resulting in high costs. Moreover, the mechanical linkages extend in the same space, where dough is fed by the rollers, making it difficult to comply with hygienic specifications. With time the components become contaminated with dough and have to be serviced or exchanged.

SUMMARY

Accordingly, it is an object of the invention to provide an improved rotary dough molding device. In particular, the rotary dough molding device shall allow for optimal adjustment of the gap between die roller and feed roller and also comply with hygienic specifications. The construction shall be simple and space saving.

The problem of the invention is solved by a rotary dough molding machine as defined in the opening paragraph, in that the adjusting means comprise
a first drive acting on the first end of the adjustable roller causing a movement of said first end in a first direction transverse to the rotational axis of the adjustable roller, and
a second drive acting on the second end of the adjustable roller causing a movement of said second end in a second direction that is essentially parallel to the first direction,
wherein the first drive and the second drive can be actuated independently of each other.

Thus, the first end of the adjustable roller and the second end of the adjustable roller are adjustable independent from each other. Hence, the rotational axis of the adjustable roller may be (slightly) tilted relative to the frame. The adjustment means may therefore compensate for tolerances and suboptimal alignments of components. Particularly, the gap between die roller and feed roller can be adjusted such that the gap has constant width along its entire length.

With the invention an optimal alignment of the feed roller relative to the die roller may be achieved. The possibility of independently actuating the drives allows for an optimal alignment of the rollers relative to each other. Tolerances or suboptimal alignment of other components of the machine, particularly the die roller, may be compensated reliably and at any stage of operation. The invention allows side to side adjustment to compensate for imbalanced product weight (also during production of molded dough products). Moreover, mechanical linkages extending from one side to the other side of the machine are not needed any more, guaranteeing a high hygienic standard. The absence of the mechanical linkages also allows the hopper to be tilted to a large angle (preferably below the horizontal line) which facilitates the use of the rotary moulder in combined lines.

In a preferred embodiment the feed roller is the adjustable roller, which is movable relative to the frame by the adjusting means. However, in an alternate embodiment (also) the die roller could be the adjustable roller, which is movable relative to the frame by the adjusting means.

It is preferred that the first direction (of movement) and the second direction (of movement) of movement are defined by parallel guides.

The rotational axes of the die roller and the feed roller are essentially parallel to each other. Due to intolerances (e.g. from manufacturing) they may be slightly tilted with respect to each other. The die roller has on its surface a plurality of molds in the form of cavities (or recesses) for receiving dough. The feed roller (also called forcing roller) feeds dough into the gap between die roller and feed roller and forces the dough into the molds of the die roller. Usually, a hopper (for facilitating dough input) is provided above the gap formed between the die roller and the feed roller. The knife is used to remove (scrap) excess dough from the die roller's surface. In the scraping position the knife extends into the gap between the die roller and the feed roller. The dough remaining in the molds is subsequently removed from the die roller usually by means of a belt. The rotary dough molding machine is used for making bakery products, such as biscuits, cookies, crackers, etc. After being shaped by means of the rotary dough molding machine the (intermediate) products are brought into a baking oven for baking.

Each drive may directly or indirectly (e.g. via a transmission element, a coupling or a bearing) act on the respective end of the adjustable roller.

The first drive and the second drive each comprise an actuator, preferably a motor or a cylinder. The actuator of the first drive and the actuator of the second drive can be actuated (particularly energized) independently from each other. The actuator may be energized preferably by electric, magnetic, pneumatic and/or hydraulic energy. The drives may transmit a linear movement, a rotational movement and/or combinations thereof. A preferred embodiment is a spindle drive.

In a preferred embodiment the rotary dough molding machine comprises a control device that is in communication with the first drive and the second drive, wherein the drives can be actuated by the control device automatically and/or in dependence of commands generated by means of a human interface (e.g. touch screen, mouse, console). This allows for a precise and reliable adjustment of the adjustable roller also during operation of the machine. Deviations of an optimal alignment can be corrected immediately.

Preferably the first drive and the second drive can be actuated by the control device (also) in a synchronized manner usually synchronized actuation of the drives is done in order to increase/decrease the width of the gap, and independent actuation according to the invention is done for fine adjustment, particularly for achieving a constant gap width.

In a preferred embodiment the rotary dough molding machine comprises
- a first sensor detecting movement and/or position of the first end of the adjustable roller and/or load acting on the first end of the adjustable roller, and
- a second sensor detecting movement and/or position of the second end of the adjustable roller and/or load acting on the second end of the adjustable roller. The ends of the adjustable roller may be monitored independently from each other by (independent) sensors. Particularly, deviations of an optimal alignment of the roller may be reliably detected. The sensor may be e.g. a (linear) encoder, such as a motion encoder, or a contact-free sensor. The value measured by the sensor may be a direct or indirect measure of roller's end movement, position or load. The (first and second) sensors may be encoders (linear or angle encoders), pressure and/or force sensors (e.g. comprising at least one piezoelectric element or a strain gauge), touch-less sensors (e.g. optical or capacitive or inductive sensor), etc.

According to an embodiment the synchronization of the movements (of the roller's first and second end) is done in software by means of (continuous) evaluation of the sensor signals (first and second sensor) from either side.

In a preferred embodiment the first sensor and the second sensor are in communication with the control device, wherein the control device is capable of controlling the drives in dependence of values measured by the sensors and/or of displaying on a human interface (e.g. screen) values obtained by the sensors. A high and reliable quality of the resulting products may be achieved.

In a preferred embodiment
the adjustable roller (e.g. the feed roller) extends between a first frame portion and a second frame portion, and wherein
the first end of the adjustable roller is supported by a first bearing, that is movably mounted to the first frame portion and coupled to the first drive, and
the second end of the adjustable roller is supported by a second bearing, that is movably mounted to the second frame portion and coupled to the second drive. The adjustable roller is rotatably supported by the movable bearings. Here, the bearing acts as coupling element between each drive and the respective end of the roller.

Each bearing is held by the respective frame portion. The first and second frame portions are portions of the frame that also supports the other roller (and—if applicable—the knife).

The first and second bearings are preferably formed as bearing blocks slidably mounted within the frame (portions).

Preferably, the first drive is mounted to the first frame portion and the second drive is mounted to the second frame portion. It is advantageous, if the drives are close to the roller's end.

In a preferred embodiment each sensor is connected on the one hand with the bearing and on the other hand with the frame portion. Here, the relative motion/position between bearing and frame portion is a direct measure of the motion/position of the adjustable roller. As already mentioned the sensor may be provided in form of a (linear) encoder.

In a preferred embodiment the first drive is spatially separated from the space between the frame portions by the first frame portion and the second drive is spatially separated from the space between the frame portions by the second frame portion. Here, the drives are arranged on the outside of the frame portions, while the rollers extend inside the frame portions. The hygienic standard is increased since the drives are (completely) separated from the inner frame space that during operation also contains dough. Service and exchange of the drives are also facilitated by this embodiment.

In a preferred embodiment the first frame portion forms a first guide, preferably a slotted guide, in which the first bearing is slidably mounted and the second frame portion forms a second guide, preferably a slotted guide, in which the second bearing is slidably mounted. Here, the frame can be used as guide for the bearings.

In a preferred embodiment the first drive and the second drive are linear drives.

In a preferred embodiment the adjustable roller is continuously adjustable by the drives. Precise knife adjustment becomes possible.

Preferably, the rotary dough molding machine comprises
a first end stop for limiting the movement of the first end of the adjusting roller,
a second end stop for limiting the movement of the second end of the adjusting roller,
preferably a first end stop sensor capable of detecting the end stop position of the first end of the adjusting roller,
preferably a second end stop sensor capable of detecting the end stop position of the second end of the adjusting roller. The end stops may limit the movement of the adjustable roller (e.g. feed roller) towards the other roller (die roller). The end stops are reference positions that may be used as basis for further adjustment.

Here, two thresholds may be defined for the deviation (difference) of the two sensors signals:
If difference is less than lower threshold—don't adjust. The roller is optimally aligned.
If difference is higher than lower threshold—perform adjustment until deviation is less than lower threshold.
Preferably: If difference is higher than upper threshold—stop machine. Something is wrong and a re-alignment must be carried out.

Alignment is done by driving both drives forward (i.e. towards the other roller) until the mechanical end stops are reached in both sides. This can be detected either by monitoring the signals from end stop sensors (e.g. load cells) or by monitoring the current or power to the drive motors until the current or power reaches a predefined threshold, e.g. 50% of max. current. When the above conditions are met, the (first and second) sensor signals are evaluated and used as reference. Thus there is no requirement for manual adjustment of the two sensors (linear encoders).

The problem is also solved by a method for operating a rotary dough molding machine comprising the step of adjusting the gap between the die roller and the feed roller, wherein the first end of the adjustable roller and the second end of the adjustable roller are adjusted independently from each other.

In a preferred embodiment the method comprises the steps of comparing first data obtained by the first sensor and second data obtained by the second sensor, adjusting the gap between die roller and feed roller by actuating the first drive and/or the second drive, if the deviation between the first data and the second data exceeds a first threshold, preferably stopping the machine and/or generating a warning signal, if the deviation between the first data and the second data exceeds a second threshold, that is higher than the first threshold. The quality of the molded dough products becomes optimized and reliable.

Preferably the method comprises the steps of moving the adjustable roller by the drives until the ends of the adjustable roller have reached their end stop positions, evaluating the signals of the first sensor and the second sensor when the ends of the adjustable roller are in their end stop positions and using them as reference values for adjusting the gap between die roller and feed roller during operation of the rotary dough molding machine. Here a simple calibration of the adjusting means may be performed.

Factory calibration is may be done by moving the bearings upon which the drives act against the mechanical end stops in both sides. The adjusting roller is now perpendicular to the transport direction of the molding machine. During production the independency of the two drives can be used to correct imbalances in weight distribution of the dough products across the width of the molding machine.

The invention further allows electronic calibration of roller adjustment by means of the machine's human-machine interface (HMI). Imbalances in product weight can be corrected by the user also on the HMI by simple settings. The independent sensors (e.g. motion encoders) in both sides also make the detection of alignment errors possible and let the machine control system decide how to respond. The removal of mechanical linkages, bearings and gear segments from the product zone (between the frame portions) represents a significant advantage in relation to the sanitary design of the machine.

BRIEF DESCRIPTION OF THE DRAWINGS

For a better understanding of the invention the latter is explained in more detail with reference to the following Figures. In a simplified, schematic representation:

FIG. 2 shows in a top view the rotary dough molding machine;

DETAILED DESCRIPTION

Generally, the same parts or similar parts are denoted with the same/similar names and reference signs. The features disclosed in the description apply to parts with the same/similar names respectively reference signs. Indicating the orientation and relative position (up, down, sideward, etc.) is related to the associated Figure, and indication of the orientation and/or relative position has to be amended in different Figures accordingly as the case may be.

Figure 1:
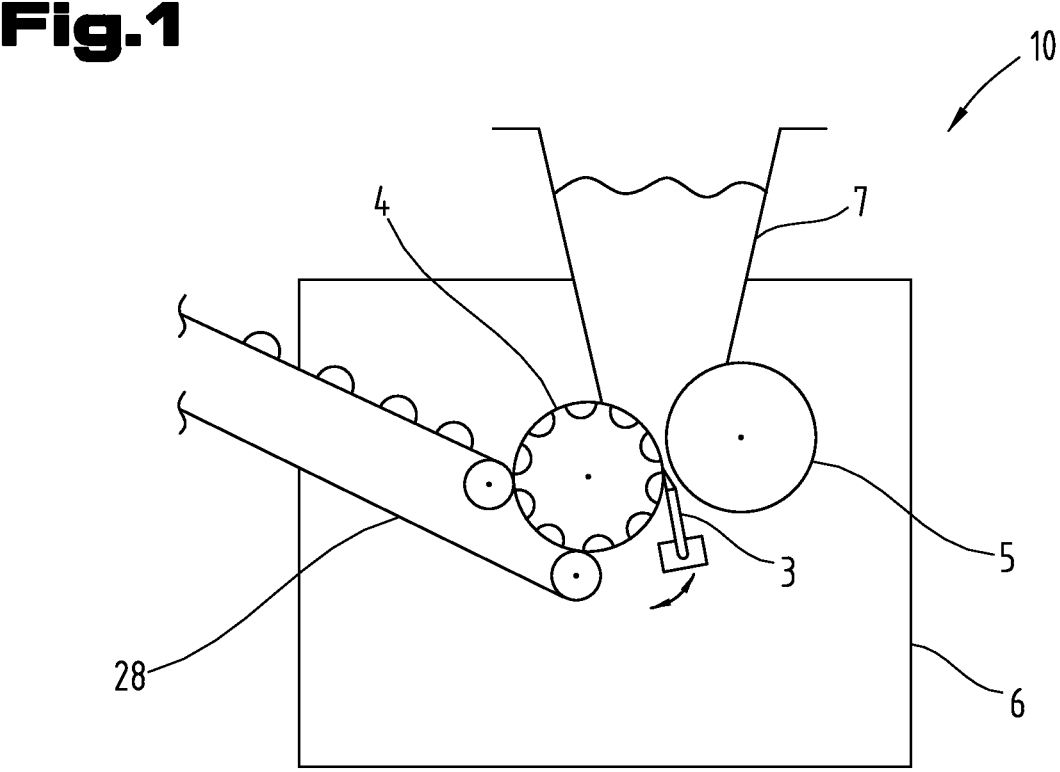
FIG. 1 shows in a schematic illustration a rotary dough molding machine.

FIG. 1 shows a rotary dough molding machine 10 comprising a frame 6, a die roller 4 and a feed roller 5, both rotatably mounted within the frame 6 about parallel axes of rotation, and a knife 3 for scraping dough from the die roller 4. A plurality of molds (in form of cavities for receiving dough) is formed in the surface of the die roller 4. The knife 3 extends between its ends along the die roller 4 and scrapes excess dough from the surface of the die roller 4. FIG. 1 shows the scraping position of the knife 3 that extends into the gap between the die roller 4 and the feed roller 5. In an inactive position the knife 3 will be distanced from the die roller 4. Movement between scraping position and inactive position is indicated by the double arrow in FIG. 1.

A hopper 7 is provided for supplying dough to the rollers 4, 5 and a (rubber) belt 28 is provided for receiving the molded dough pieces from the molds formed in the surface of the die roller 4.

FIG. 2 shows adjusting means for adjusting the gap between die roller 4 and feed roller 5. In the present embodiment the feed roller 5 is an adjustable roller, which is movable relative to the frame 6 by the adjusting means.

In an alternate embodiment (not shown) the die roller 4 could be the adjustable roller cooperating with the adjusting means (for adjusting the gap). In that case the knife 3 should be adjustable (by the adjusting means or a separate means), too.

The adjusting means comprises a first drive 1 and a second drive 2 that can be actuated independently of each other. The first drive 1 acts on the first end 51 of the adjustable roller 5 causing a movement of said first end 51 in a first direction x transverse to the rotational axis 50 of the adjustable roller 5. The second drive 2 acts on the second end 52 of the adjustable roller 5 causing a movement of said second end 52 in a second direction x' that is essentially parallel to the first direction x. In the present embodiment first drive 1 and second drive 2 are linear drives and the directions x, x' linear directions. The first drive 1 and the second drive 2 each comprise an actuator, preferably a motor or a cylinder. In a preferred embodiment the drives 1, 2 are spindle drives.

Figure 4:
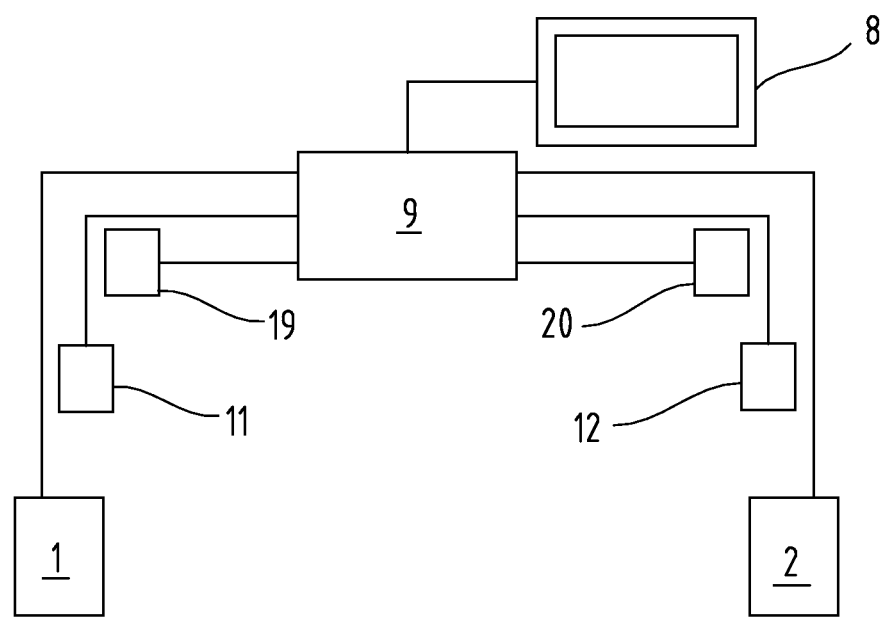
FIG. 4 shows the communication between drives, sensors and control device.

As can be seen from the preferred embodiment of FIG. 4 the rotary dough molding machine 10 may comprise a control device 9 that is in communication with the first drive 1 and the second drive 2, wherein the drives 1, 2 can be actuated by the control device 9 automatically and/or in dependence of commands generated by means of a human interface 8. The first drive 1 and the second drive 2 can be actuated by the control device 9 in a synchronized manner (to increase/decrease the gap) or independently from each other (to perform fine adjustment, particularly to obtain constant gap width throughout the length).

It is preferred that the ends 51, 52 of the adjustable roller 5 are continuously adjustable by the drives 1, 2. During the adjustment procedure of the feed roller 5 relative to the die roller 4 the first end 51 and the second end 52 may be adjusted independently from each other and at any stage of operation. In FIG. 2 such a fine adjustment is indicated by the possibility of a (slightly) tilting rotational axis 50 of feed roller 5.

Figure 3:
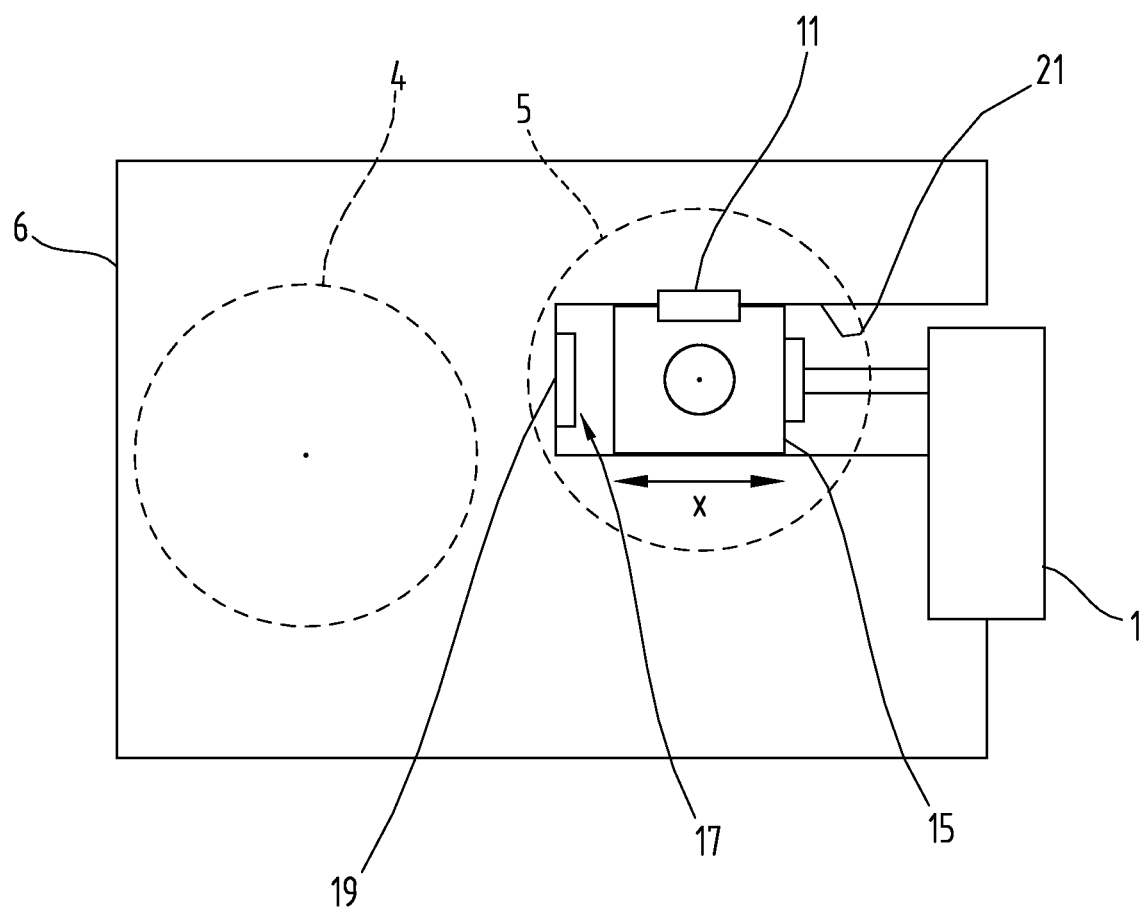
FIG. 3 shows in a side view the rotary dough molding machine.

As can be seen from FIGS. 2 and 3 the rotary dough molding machine 10 comprises a first sensor 11 detecting movement and/or position of the first end 51 of the adjustable roller 5 and/or load acting on the first end 51 of the adjustable roller 5, and a second sensor 12 detecting movement and/or position of the second end 52 of the adjustable roller 5 and/or load acting on the second end 52 of the adjustable roller 5.

As can be seen from FIG. 4 the first sensor 11 and the second sensor 12 are in communication with the control device 9, wherein the control device 9 is capable of controlling the drives 1, 2 in dependence of values measured by the sensors 11, 12 and/or of displaying on a human interface 8 values obtained by the sensors 11, 12.

In the preferred embodiment of FIG. 2 the adjustable (feed) roller 5 extends between a first frame portion 13 and a second frame portion 14. The frame portions 13, 14 belong to the same frame 6 that rotatably supports the die roller 4. The first end 51 of the roller 5 is supported by a first bearing 15, which is movably mounted to the first frame portion 13 and coupled to the first drive 1. The second end 52 of the roller 5 is supported by a second bearing 16, which is movably mounted to the second frame portion 14 and coupled to the second drive 2. The bearings 15, 16 are formed as bearing blocks slidably mounted to the frame (portions).

The first drive 1 may be mounted to the first frame portion 13 and the second drive 2 is mounted to the second frame portion 14 (as indicated in FIGS. 2 and 3). It would be preferred, if the first drive 1 is spatially separated from the space between the frame portions 13, 14 by the first frame portion 13 and the second drive 2 is spatially separated from the space between the frame portions 13, 14 by the second frame portion 14. With other words: the drives 1, 2 may be arranged outside the space between the frame portions 13, 14.

The first frame portion 13 forms a first (linear) guide 21, preferably a slotted guide, in which the first bearing 15 is slidably mounted. The second frame portion 14 forms a second (linear) guide 22, preferably a slotted guide, in which the second bearing 16 is slidably mounted. Each bearing 15, 16 may communicate with the respective guide 21, 22 via at least one sliding disc, preferably made of plastic, inserted between bearing 15, 16 and guide 21, 22. Recesses may be formed in the bearings 15, 16 or in the guide 21, 22 for receiving the sliding disc(s).

FIGS. 2 and 3 show that the rotary dough molding machine 10 further comprises a first end stop 17 for limiting the movement of the first end 51 of the adjusting roller 5 (towards the other roller 4) and a second end stop 18 for limiting the movement of the second end 52 of the adjusting roller 5 (towards the other roller 4).

In the preferred embodiment a first end stop sensor 19 capable of detecting the end stop position of the first end 51 of the adjusting roller 5 and a second end stop sensor 20 capable of detecting the end stop position of the second end 52 of the adjusting roller 5 are provided. The end stop sensors 19, 20 are in communication with the control device 9 and may be e.g. touch and/or load sensors.

The method for operating a rotary dough molding machine 10 comprises the step of adjusting the gap between the die roller 4 and the feed roller 5, wherein the first end 51 of the adjustable (here: feed) roller 5 and the second end 52 of the adjustable roller 5 are adjusted independently from each other. By this way the rotational axis 50 of the roller 5 may be slightly tilted and aligned relative to the other roller 4, if necessary.

In a preferred embodiment the method further comprises the steps of
comparing first data obtained by the first sensor 11 (e.g. positional sensor) and second data obtained by the second sensor 12 (e.g. positional sensor),
adjusting the gap between die roller 4 and feed roller 5 by actuating the first drive 1 and/or the second drive 2, if the deviation between the first and second data (e.g. positional data) exceeds a first threshold.

It is preferred to stop the machine 10 and/or generating a warning signal, if the deviation between the first data and the second data exceeds a second threshold, which is higher than the first threshold.

In a further embodiment the method comprises the steps of
moving the adjustable roller 5 by the drives 1, 2 until the ends 51, 52 of the adjustable roller 5 have reached their end stop positions (here: the bearings 15, 16 abut against the end stops 17, 18),
evaluating the signals of the first sensor 11 and the second sensor 12 when the ends 51, 52 of the adjustable roller 5 are in their end stop positions and using them as reference values for adjusting the gap between die roller 4 and feed roller 5 during operation of the rotary dough molding machine 10.

It is noted that the invention is not limited to the embodiments disclosed hereinbefore, but combinations of the different variants are possible. For example rotary drives may be used (instead of linear drives) as well. The coupling between each drive and corresponding roller end may be different and comprise other/further transmission elements as in the embodiments shown. The drives may be alternatively arranged on the inner side of the frame portions. The movement of the adjusting roller may follow a linear run, an arc-shaped run or any other run and/or may comprise a rotational component. Alternatively to a slotted guide within the frame also a guide structure attached to the frame would be possible. Any mounting allowing a movement of the roller between the working position and an inactive position would be possible. The (first and second) sensors may be encoders (linear or angle encoders), pressure and/or force sensors (e.g. comprising at least one piezoelectric element or a strain gauge), touch-less sensors (e.g. optical or capacitive or inductive sensor), etc. In reality, the rotary dough molding machine may have more or less parts than shown in the Figures. The machine and parts thereof may also be shown in different scales and may be bigger or smaller than depicted. Finally, the description may comprise subject matter of further independent inventions.

LIST OF REFERENCE SIGNS

1 first drive
2 second drive
3 knife
4 die roller
5 feed roller
6 frame
7 hopper 8 human interface
9 control device
10 rotary dough molding machine
11 first sensor
12 second sensor
13 first frame portion
14 second frame portion
15 first bearing
16 second bearing
17 first end stop
18 second end stop
19 first end stop sensor
20 second end stop sensor
21 first guide
22 second guide
28 belt
50 rotational axis of roller
51 first end of roller 5
52 second end of roller 5

The invention claimed is:

1. Rotary dough molding machine, comprising:
a frame,
a die roller and a feed roller rotatably mounted to the frame, and
an adjuster that adjusts the gap between die roller and feed roller,
wherein one of the die roller and the feed roller is an adjustable roller, which is movable relative to the frame by the adjuster,
wherein the adjuster comprises a first drive acting on the first end of the adjustable roller causing a movement of said first end in a first direction transverse to the rotational axis of the adjustable roller, and a second drive acting on the second end of the adjustable roller causing a movement of said second end in a second direction that is essentially parallel to the first direction, wherein the first drive and the second drive are configured to be actuated independently of each other,
wherein the rotary dough molding machine further comprises first and second sensors and a control device,
wherein the first sensor is configured to detect position of the first end of the adjustable roller,
wherein the second sensor is configured to detect position of the second end of the adjustable roller, and
wherein the control device is operably coupled to the first drive, the second drive, the first sensor, and the second sensor, and wherein the control device is configured to control the first drive and the second drive in dependence of values measured by the first sensor and the second sensor.

2. Rotary dough molding machine according to claim 1, wherein:
the first drive and the second drive are configured to be actuated by the control device in dependence of commands generated by means of a human interface.

3. Rotary dough molding machine according to claim 1, wherein the first drive and the second drive are actuated by the control device in a synchronized manner.

4. Rotary dough molding machine according to claim 2, wherein the control device is further configured to display values obtained by the first and second sensors on a human interface.

5. Rotary dough molding machine according to claim 1, wherein:
the adjustable roller extends between a first frame portion and a second frame portion,
the first end of the adjustable roller is supported by a first bearing, that is movably mounted to the first frame portion and coupled to the first drive, and
the second end of the adjustable roller is supported by a second bearing, that is movably mounted to the second frame portion and coupled to the second drive.

6. Rotary dough molding machine according to claim 5, wherein the first drive is mounted to the first frame portion and the second drive is mounted to the second frame portion.

7. Rotary dough molding machine according to claim 5, wherein the first drive is spatially separated from the space between the first and second frame portions by the first frame portion and the second drive is spatially separated from the space between the first and second frame portions by the second frame portion.

8. Rotary dough molding machine according to claim 5, wherein the first frame portion forms a first guide, in which the first bearing is slidably mounted and the second frame portion forms a second guide, in which the second bearing is slidably mounted.

9. Rotary dough molding machine according to claim 1, wherein the first drive and the second drive are linear drives.

10. Rotary dough molding machine according to claim 1, wherein the first and second ends of the adjustable roller are continuously adjustable by the first and second drives.

11. Rotary dough molding machine according to claim 1, further comprising:
a first end stop configured to limit movement of the first end of the adjustable roller,
a second end stop configured to limit movement of the second end of the adjustable roller,
a first end stop sensor configured to detect the end stop position of the first end of the adjustable roller, and
a second end stop sensor configured to detect the end stop position of the second end of the adjustable roller.

12. Rotary dough molding machine according to claim 1, wherein the adjustable roller comprises the feed roller.

13. Rotary dough molding machine according to claim 6, wherein the first frame portion forms a first slotted or linear guide in which the first bearing is slidably mounted and the second frame portion forms a second slotted or linear guide in which the second bearing is slidably mounted.

14. Method for dough molding comprising:
providing a rotary dough molding machine including
a frame,
a die roller and a feed roller rotatably mounted to the frame, and
an adjuster that adjusts the gap between die roller and feed roller,
wherein one of the die roller and feed roller is an adjustable roller, which is movable relative to the frame by the adjuster,
wherein the adjuster comprises a first drive acting on the first end of the adjustable roller causing a movement of said first end in a first direction transverse to the rotational axis of the adjustable roller, and a second drive acting on the second end of the adjustable roller causing a movement of said second end in a second direction that is essentially parallel to the first direction, wherein the first drive and the second drive are configured to be actuated independently of each other,
wherein the rotary dough molding machine further comprises first and second sensors and a control device,
wherein the first sensor is configured to detect position of the first end of the adjustable roller, wherein the second sensor is configured to detect position of the second end of the adjustable roller, and wherein the control device is operably coupled to the first drive, the second drive, the first sensor, and the second sensor; and adjusting the gap between the die roller and the feed roller by operation of the controller, wherein the first end of the adjustable roller and the second end of the adjustable roller are adjusted independently from each other, and wherein the control device is configured to control the first drive and the second drive in dependence of values measured by the first sensor and the second sensor.

15. Method according to claim 14, further comprising:

comparing first data obtained by the first sensor and second data obtained by the second sensor, and adjusting the gap between die roller and feed roller by actuating at least one of the first drive or the second drive, if the deviation between the first data and the second data exceeds a first threshold.

16. Method according to claim 15, further comprising stopping the rotary dough molding machine generating a warning signal if the deviation between the first data and the second data exceeds a second threshold which is higher than the first threshold.

17. Method according to claim 14, wherein the rotary dough molding machine further comprises a first end stop configured to limit movement of the first end of the adjustable roller, a second end stop configured to limit movement of the second end of the adjustable roller, wherein the first sensor is configured to detect the end stop position of the first end of the adjustable roller, and wherein the second sensor is configured to detect the end stop position of the second end of the adjustable roller, and the method further comprises moving the adjustable roller by the first and second drives until the first and second ends of the adjustable roller have reached their corresponding first and second end stop positions; and evaluating the signals of the first sensor and the second sensor when the first and second ends of the adjustable roller are in their corresponding first and second end stop positions and using them as reference values for adjusting the gap between die roller and feed roller.

18. Rotary dough molding machine according to claim 1, wherein:

the first sensor is configured to detect movement of the first end of the adjustable roller; and the second sensor is configured to detect movement of the second end of the adjustable roller.

19. Rotary dough molding machine according to claim 1, wherein:

the first sensor is configured to detect load acting on the first end of the adjustable roller; and the second sensor is configured to detect load acting on the second end of the adjustable roller.

20. Rotary dough molding machine according to claim 1, wherein:

the first drive and the second drive are configured to be actuated by the control device automatically.

\* \* \* \* \*